UNITED STATES PATENT OFFICE.

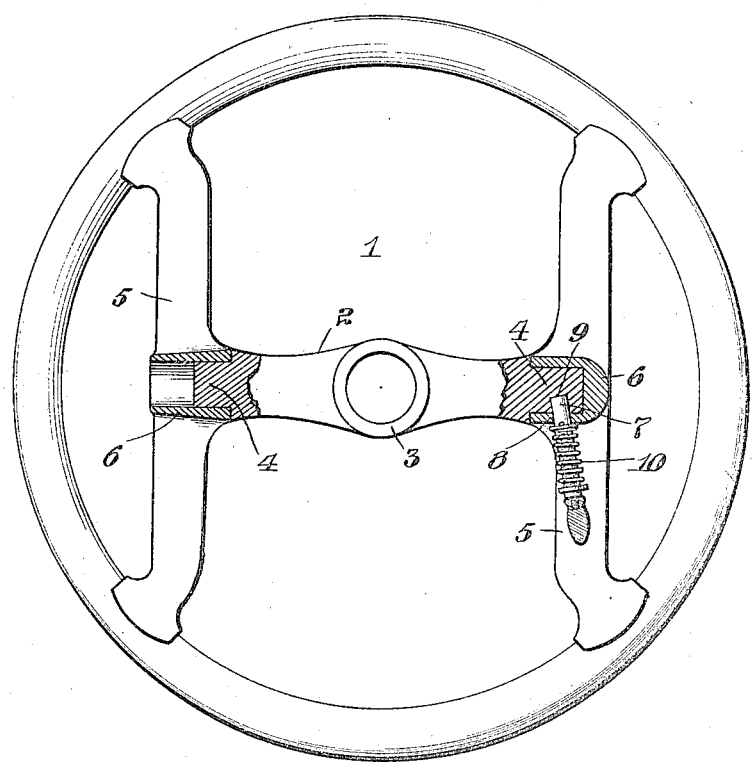

GRANT E. SMITH, OF POUGHKEEPSIE, NEW YORK.

TILTING STEERING-WHEEL.

1,247,734.　　　　Specification of Letters Patent.　　Patented Nov. 27, 1917.

Application filed November 2, 1915. Serial No. 59,250.

*To all whom it may concern:*

Be it known that I, GRANT E. SMITH, residing at and whose post-office address is Poughkeepsie, in the county of Dutchess and State of New York, have invented certain new and useful Improvements in Tilting Steering-Wheels; and I do hereby declare the following to be a full, clear, and exact description of the invention, such as will enable others skilled in the art to which it appertains to make and use the same.

My invention has reference to steering wheels of automobiles and has primary reference to those which are adapted to be tilted or turned out of their normal positions in order to facilitate the entrance or exit of the operator to or from the vehicle.

In the accompanying drawing I have illustrated the invention in a vertical sectional view.

Referring to the drawing the metallic frame 1, commonly known as a spider, constitutes the support for the circular rim of a steering wheel, the rim being secured to the spider by any preferred means. The central transverse member 2 of the spider is formed with a collar 3 adapted to receive the steering post of the vehicle in the usual or any preferred manner.

At both of its outer ends I have shown the transverse member 2 reduced as at 4 to constitute a pair of trunnions on which the lateral arms 5 of the spider are journaled. I have shown the arms 5 formed with hubs or bearings 6 adapted to receive the trunnions 4 of the central transverse member 2 of the spider.

Mounted in one of the arms 5 I have shown a bolt 7 while one of the hubs 6 and its adjacent trunnion 4 are formed with registering slots 8, 9, adapted to receive the bolt 7, the latter being normally held projected by a coil spring 10.

In use with the parts in the position shown, that is, with the bolt 7 holding the arms 5 of the spider rigidly with relation to the transverse member 2, it is only necessary for the operator to retract the bolt in order to tilt the steering wheel, the hubs 6 turning on the trunnions 4.

I claim as my invention:

1. A tilting steering wheel having a spider including a central transverse member formed with a central collar to receive a steering post, said transverse member having trunnions at its outer extremities, the lateral arms of said spider having hubs to receive said trunnions, and means for locking said hubs to said trunnions.

2. A tilting steering wheel having a spider including a central transverse member formed with a central collar to receive a steering post, said transverse member having its outer extremities reduced to form trunnions, the lateral arms of said spider having hubs fulcrumed on said trunnions, one of said trunnions having a recess, and a latch extending through one of said hubs and adapted to be received by said recess.

In testimony whereof, I have signed this specification in the presence of two subscribing witnesses.

GRANT E. SMITH.

Witnesses:
　MARION I. BALFOUR,
　EDITH R. PRENDERGAST.